(12) United States Patent
Saint-Hilaire et al.

(10) Patent No.: US 6,831,598 B2
(45) Date of Patent: Dec. 14, 2004

(54) METHOD OF EXCHANGING DATA BETWEEN A LOCAL DEVICE AND A CENTRAL SERVER

(75) Inventors: Ylian Saint-Hilaire, Hillsboro, OR (US); Jim Edwards, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 10/282,572

(22) Filed: Oct. 29, 2002

(65) Prior Publication Data

US 2003/0065443 A1 Apr. 3, 2003

Related U.S. Application Data

(62) Division of application No. 09/967,779, filed on Sep. 28, 2001, now Pat. No. 6,504,503.

(51) Int. Cl.[7] .......................... H04B 7/185; G06F 15/16
(52) U.S. Cl. ........................ 342/357.09; 342/357.08; 342/357.1; 709/219
(58) Field of Search ................... 342/357.08–357.1, 342/357.17; 709/219

(56) References Cited

U.S. PATENT DOCUMENTS

| | | | | |
|---|---|---|---|---|
| 5,355,140 A | * | 10/1994 | Slavin et al. ............ 342/357.09 |
| 5,751,246 A | | 5/1998 | Hertel | |
| 6,229,478 B1 | * | 5/2001 | Biacs et al. ............ 342/357.09 |
| 6,374,179 B1 | * | 4/2002 | Smith et al. ............ 342/357.1 |
| 6,377,210 B1 | * | 4/2002 | Moore .................... 342/357.09 |
| 6,430,498 B1 | * | 8/2002 | Maruyama et al. .... 342/357.08 |
| 6,504,503 B1 | * | 1/2003 | Saint-Hilaire et al. . 342/357.09 |
| 2001/0037305 A1 | * | 11/2001 | Mochizuki .................... 701/201 |
| 2002/0035605 A1 | * | 3/2002 | McDowell et al. ......... 709/206 |
| 2002/0073240 A1 | * | 6/2002 | Kokkinen et al. .......... 709/249 |
| 2002/0077080 A1 | * | 6/2002 | Greene ....................... 455/456 |
| 2002/0119789 A1 | * | 8/2002 | Friedman .................... 455/456 |
| 2002/0126701 A1 | * | 9/2002 | Requena ..................... 370/469 |
| 2002/0145561 A1 | * | 10/2002 | Sandhu et al. ......... 342/357.09 |
| 2003/0004743 A1 | * | 1/2003 | Callegari ....................... 705/1 |
| 2003/0004802 A1 | * | 1/2003 | Callegari ..................... 705/14 |
| 2003/0004916 A1 | * | 1/2003 | Lewis ............................ 707/1 |
| 2003/0028621 A1 | * | 2/2003 | Furlong et al. ............. 709/219 |
| 2003/0055983 A1 | * | 3/2003 | Callegari .................... 709/227 |
| 2003/0117658 A1 | * | 6/2003 | Takenaga .................... 358/302 |

\* cited by examiner

*Primary Examiner*—Thomas H. Tarcza
*Assistant Examiner*—Fred H. Mull
(74) *Attorney, Agent, or Firm*—Pillsbury Winthrop LLP

(57) ABSTRACT

A peer-to-peer global positioning system includes at least one location aware device to store position data. The at least one location aware device includes a first data transmitter and a first data receiver. An electronic device has a second data transmitter and a second data receiver. The second data transmitter transmits a position data request to the first data receiver. A memory storage device to store position data transmitted from the first data transmitter and received by the second data receiver.

24 Claims, 12 Drawing Sheets

| User Name | Proximity | Reliability/Time | Speed | Track |
|---|---|---|---|---|
| Frank Rizzo | 100 miles | **** | 25 mph NW | |
| Steve Kissel | 255 miles | ** | 30 mph SE | |
| Joe Jones | 2525 miles | * | 2 mph S | |

905 → User Name
910 → Proximity
915 → Reliability/Time
920 → Speed
925 → Track
900 → (table)

| User Name | Proximity | Reliability/Time | Speed | Track |
|---|---|---|---|---|
| Frank Rizzo | 100 miles | **** | 25 mph NW | |
| Steve Kissel | 255 miles | ** | 30 mph SE | |
| Joe Jones | 2525 miles | * | 2 mph S | |

FIG. 9

METHOD OF EXCHANGING DATA BETWEEN A LOCAL DEVICE AND A CENTRAL SERVER

This application is a divisional application of U.S. patent application Ser. No. 09/967,779, filed Sep. 28, 2001, now U.S. Pat. No. 6,504,503.

BACKGROUND OF THE INVENTION

1. Field of the Invention

The present invention generally relates to electronic devices that determine their Global Position System ("GPS") coordinates. More specifically, the present invention relates to a system and apparatus for acquiring and sharing GPS position data with other devices via a network.

2. Discussion of the Related Art

Location aware devices utilizing GPS devices are known in the art. The GPS devices are utilized to determine the position of the location aware device. A GPS device typically acquires the exact GPS coordinates (degrees longitude, degrees latitude, etc.) of the GPS device. However, GPS coordinates are often useful to devices which do not have a GPS device.

In a situation where a user of a computer or a Personal Digital Assistant ("PDA") desires to determine the approximate or exact physical location of his computer, the computer or PDA can transmit a wireless signal requesting a location aware device to provide GPS coordinates to the computer. Although the GPS coordinates requested are those of the location aware device, and not the computer or PDA, such information can be useful to the computer or PDA to approximate its GPS position. The location aware device can be an electronic device having GPS coordinates stored in a memory, and typically includes a data transmitter. Wireless technologies have been utilized to transmit GPS coordinates from a location aware device to a computer. However, in some technologies in the art, there is a high cost per byte of data sent via wireless technologies, such as a cellular phone.

It is expensive to transmit data via many wireless technologies, such as Cellular Digital Packet Data ("CDPD") and some older digital technologies utilized by some cellular telephone systems today. Accordingly, it is cost prohibitive to use such wireless technologies to acquire or transmit GPS coordinates.

Current web services application programs allow for automate Internet browsing. For example, such programs can be utilized for business-to-business applications such as buying books. The web services application program can be programmed to purchase books through an Internet bookseller. The web services application program can then access the Internet bookseller's web site and automatically purchase books. Web services application programs access Internet web pages that are typically only machine-readable. The web services application programs allow business-to-business transactions to occur even if the user-friendly graphical user interface of the regular Internet web site of a retailer has changed.

However, such web services application programs do not utilize GPS coordinates for commercial or other useful purposes. For example, current application programs do not utilize the GPS coordinates of the computer or PDA to track the movement of the computer or PDA and transfer information concerning a business to the computer or PDA based upon its GPS coordinates.

Accordingly, it would be useful if the art would provide for a more inexpensive for a computer or PDA to acquire GPS coordinates via a wireless technology. It would also be beneficial if the GPS coordinates were to be utilized by a web services application program.

BRIEF DESCRIPTION OF THE DRAWINGS

FIG. 9 illustrates a "buddy list" of predetermined devices using a web services application program according to an embodiment of the invention;

DETAILED DESCRIPTION

According to an embodiment of the present invention, an electronic device may acquire its physical location by transmitting a position request signal. A separate device may receive the position request signal and transmit a signal containing the physical position of the requesting device. The requesting device may then share its position data with remote users via a web services application program over a network or the Internet. The web services application program may include a mapping program to determine the distance between a user running the web services application program and another user whose position is known.

Figure 1:
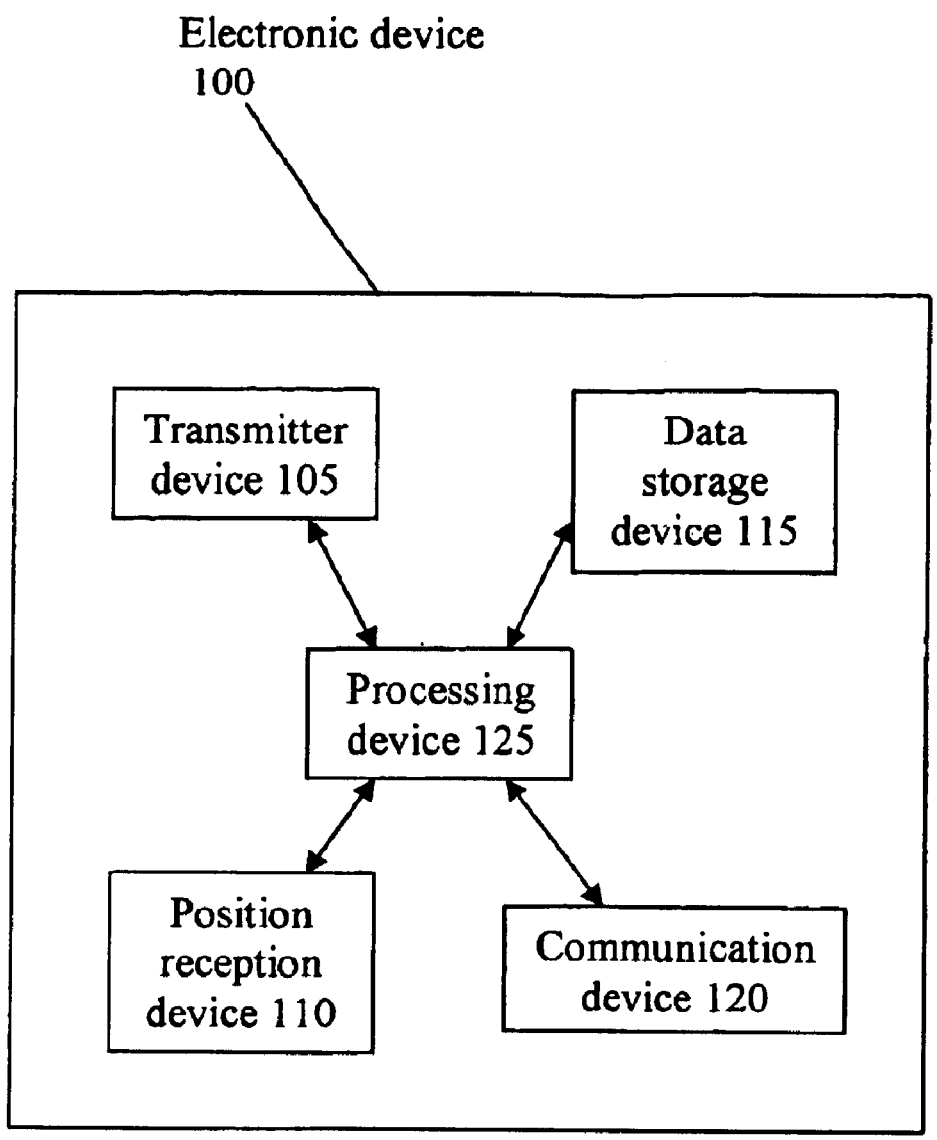
FIG. 1 illustrates a device capable of determining its position and transmitting the position to a remote server according to an embodiment of the present invention.

FIG. 1 illustrates an electronic device 100 capable of determining its position and transmitting the position to a remote server according to an embodiment of the present invention. The electronic device 100 may be a computer, a cellular phone, a Personal Digital Assistant (PDA), or any other suitable device. As illustrated, the electronic device 100 has a transmitter device 105.

According to an embodiment of the invention, the electronic device 100 may move to different geographic locations. A user may cause the electronic device 100 to determine its position. Alternatively, the electronic device 100 may be preprogrammed to automatically attempt to determine its position. To determine its position, the transmitter device 105 may send out a radio signal using Bluetooth, 802.11a, 802.11b, or Radio Frequency Identification ("RFID"). Alternatively, the device may send a signal via Infra-Red (IR), or via any other suitable data transfer technology. Bluetooth 1.1 standard, Bluetooth SIG Inc., March 2001, is an open standard for short-range transmission of digital devices. Bluetooth provides up to 720 Kbps data transfer within a range of 10 meters, and up to 100 meters with a power boost. Bluetooth uses omnidirectional radio waves that can transmit through walls and other non-metal barriers. Bluetooth transmits in the unlicensed 2.4 GHz band.

Specification 802.11 is a family of IEEE standards for wireless Local Area Networks ("LANs"). The IEEE 802.11b standard, IEEE std. 802.11b, September 1999, defines an 11 Megabits per second ("Mbps") data rate in the 2.4 GHz band. The IEEE 802.11a standard, IEEE std. 802.11a-1999, defines 24 Mbps in the 5 GHz band. REID, as specified in a collection of air interface standards (as specified in SC31/WG4/SG3 documents at www.rifid.org), is a data collection technology that utilizes an electronic tag to store identification data and a wireless transmission method to capture data from the tag device. IR technology utilizes thermal radiation of wavelengths longer than those of visible light to transmit data.

After the transmitter device 105 sends out a position request signal, a remote device that receives the signal may transmit a data signal representing the position in response. The position data may include global positioning system ("GPS") coordinates representing the position of the remote device. Note that although the GPS coordinates are for the remote device, they are very relevant to the electronic device. This is especially true for short range wireless technology, such as Bluetooth (which may only transmit and receive a wireless signal within a range of about 10 meters).

A position reception device 110 on the electronic device 100 may receive this position signal. There may be more than one remote device the sends a position signal that is received by the position reception device 110 on the device 100. In such a scenario, the device 100 may (a) use the data from the signal received first, (b) use the data from the strongest signal, (c) may average the position data from all received or certain predetermined received signals, or (d) use data based upon a preprogrammed priority order (e.g., signals from a device installed by company Z take priority over signals from a device installed by company Y), etc. Priority may also be determined in any other suitable manner. The electronic device 100 may include a processing device 125 to determine position data to use when multiple position signals are received.

Once the position data is received, the device 100 may store that data in a storage device 115 such as a Random Access Memory (RAM) or a hard or floppy disk drive, for example. The position data may then be sent to a web server on the Internet, for example, via a communication device 120 such as a modem or an Ethernet device, for example.

Figure 2:
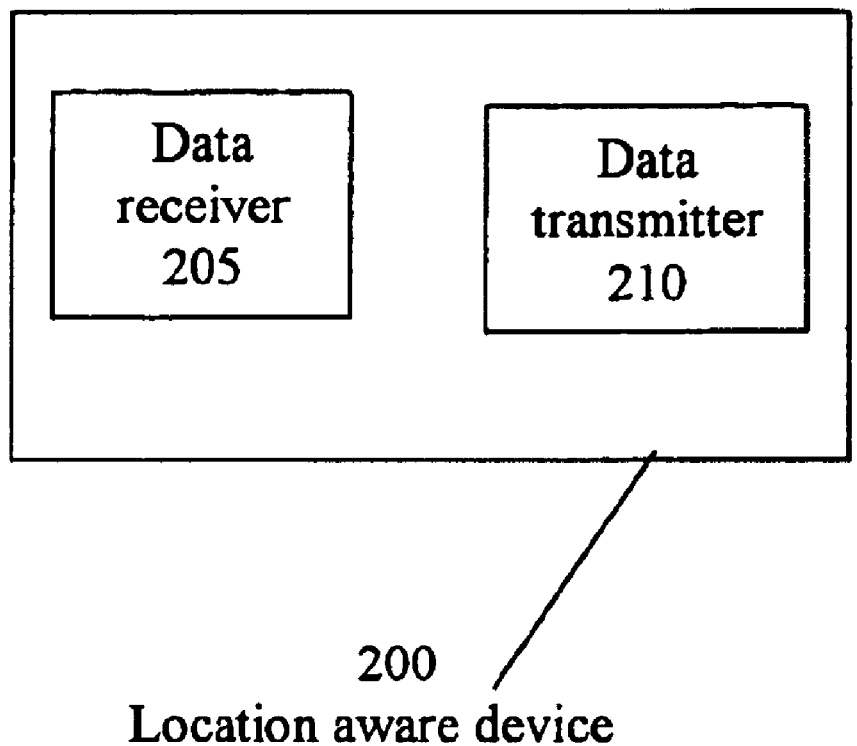
FIG. 2 illustrates a location aware device according to an embodiment of the present invention.

FIG. 2 illustrates a location aware device 200 according to an embodiment of the present invention. The location aware device 200 may have prior information about its physical position stored in a Random Access Memory ("RAM"), for example. Alternatively, in a situation where the location aware device 200 is located on an object that may change locations (such as a passenger train, for example), the location aware device 200 may include a Global Positioning System (GPS) receiver that may periodically determine its own position. The location aware device 200 may include a data receiver 205 and a data transmitter 210. When the data receiver 205 receives a position request from an electronic device 100, the data transmitter 210 may then transmit a signal containing the position, which may be received by the electronic device 100. The data transmitter 210 may continually send a signal containing the position of the location aware device 200 for a predetermined amount of time. Alternatively, the data transmitter 210 may continually send the signal containing the position until the data receiver 205 receives a signal from the electronic device 100 indicating that the data has been received.

Figure 3:
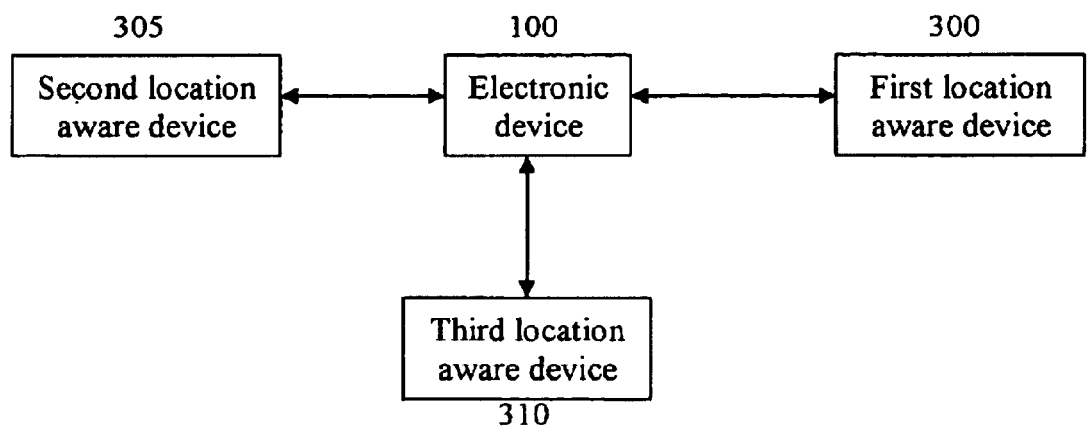
FIG. 3 illustrates a peer-to-peer network including an electronic device and multiple location aware devices according to an embodiment of the present invention.

FIG. 3 illustrates a peer-to-peer network including an electronic device 100 and multiple location aware devices 300, 305, and 310 according to an embodiment of the present invention. Each of the location aware devices 300, 305, and 310 are similar to, or the same as, the location aware device 200. The electronic device 100 may transmit a signal requesting its position. Any of the location aware devices 300, 305, and 310 that receive the signal may then respond with a signal contain the position of the respective position aware device 300, 305, or 310. If all three location aware devices 300, 305 or 310 respond with a signal containing its position, the device 100 may use the first received signal as the position of the device 100. Alternatively, as discussed above, the device 100 may use the strongest signal as its approximate position, or may utilize the received signals in any suitable manner to determine its approximate position.

Figure 4:
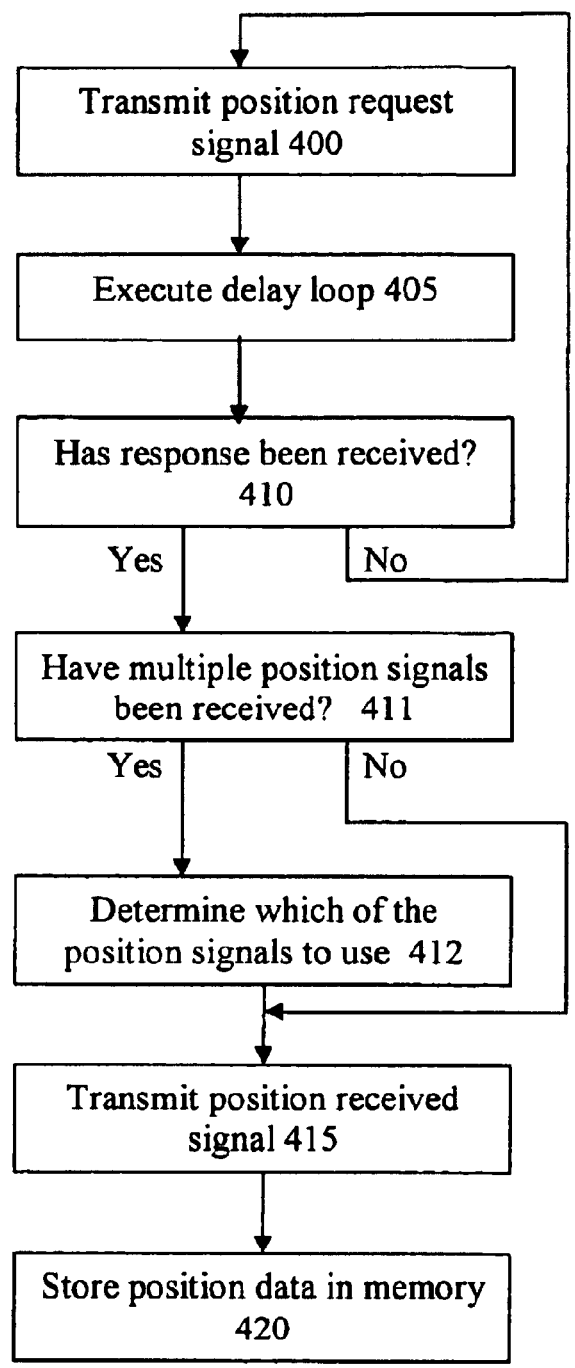
FIG. 4 illustrates a process by which an electronic device may acquire data concerning its physical position according to an embodiment of the present invention.

FIG. 4 illustrates a process by which the electronic device 100 may acquire data concerning its physical position according to an embodiment of the present invention. First, the transmitter device 105 of the electronic device 100 may transmit 400 a signal containing the position request. Next, the electronic device may execute 405 a delay while waiting for a signal containing the position to be received. After the delay is over, the electronic device 100 determines 410 whether a signal containing the position has been received. If such a signal has not been received, processing returns to step 400. However, if such a position signal has been received, the electronic device 100 may then determine 411 whether multiple position signals have been received. If "yes," the electronic device 100 may determine which of the position signals to use 412 based on predetermined criteria, and processing may continue to operation 415. If "no," at operation 411, processing proceeds directly to operation 415. At step 415, the electronic device 100 may transmit a signal via its transmitter device 110 to indicate that the signal containing the position data has been received. Finally, the position data is stored 420 in a data storage device 115 of the electronic device 100. In other embodiments, other suitable methods of acquiring position data may be utilized.

Figure 5:
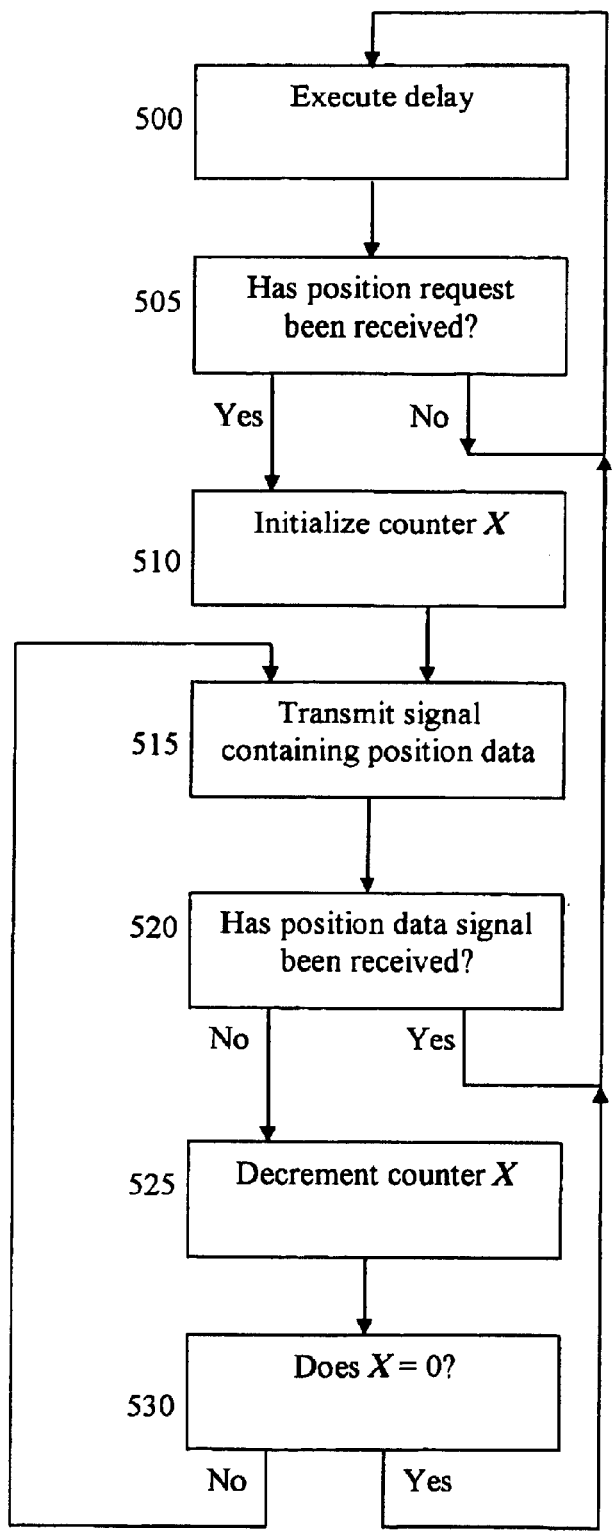
FIG. 5 illustrates a process by which a location aware device transmits position data according to an embodiment of the present invention.

FIG. 5 illustrates a process by which a location aware device 200 transmits position data according to an embodiment of the present invention. First, the location aware device 200 may execute 500 a delay. The delay is illustratively executed to conserve power. If the location aware device 200 utilizes a battery as it source of power, then it is inefficient for the location aware device 200 to continually check for signals from other devices requesting position data. Therefore, to conserve power, an embodiment periodically lowers the power to a minimum, during the delay. In other embodiments, the location aware device 200 may continually check for position data requests. Such an embodiment is suitable, for example, when the power supply is a solar cell.

Next, at step 505, the location aware device 200 determines whether a position request signal is being received. If no position request signal is received, processing returns to step 500. If a position request signal is received, processing proceeds to step 510. A counter X is then initialized 510. The counter X is utilized to limit the number of times the position data is transmitted, so that energy may be conserved. At step 515, the location aware device 200 may transmit 515 a signal containing the position data. Processing then proceeds to step 520, where the location aware device 200 determines whether the position data it transmitted has been received by an electronic device 100 requesting the position data. In some embodiments, an electronic device 100 receiving the position data signal transmits a signal to inform the location aware device 200 transmitting the position data that the position data has been received.

If, at step 520, the location aware device 200 has not received a signal from the electronic device 100 informing receipt of the position data, processing proceeds to step 525. However, if the position data signal has been received, processing returns to step 500. At step 525, counter X is decremented. Finally, the remote device returns to step 515 if counter X does not equal "0", and returns to step 500 if counter X does equal "0".

An embodiment of the invention may be included with a camera, such as a digital camera for taking still pictures. When a user takes a picture, the camera may immediately execute the position request process illustrated in FIG. 4 at steps 400–420. When the camera receives the position data, the position data and the time of day may be included as meta data in a data file for the digital photograph.

Meta data is supplemental information than is an attached to a file. Meta data may include file creation date (i.e., the date the photograph was taken), the software used to create the file, the type of lens used to take the photograph and the GPS location near where the photograph was taken. Operating systems such as WindowsXP now enable broad support for meta data attached to files.

Figure 6:
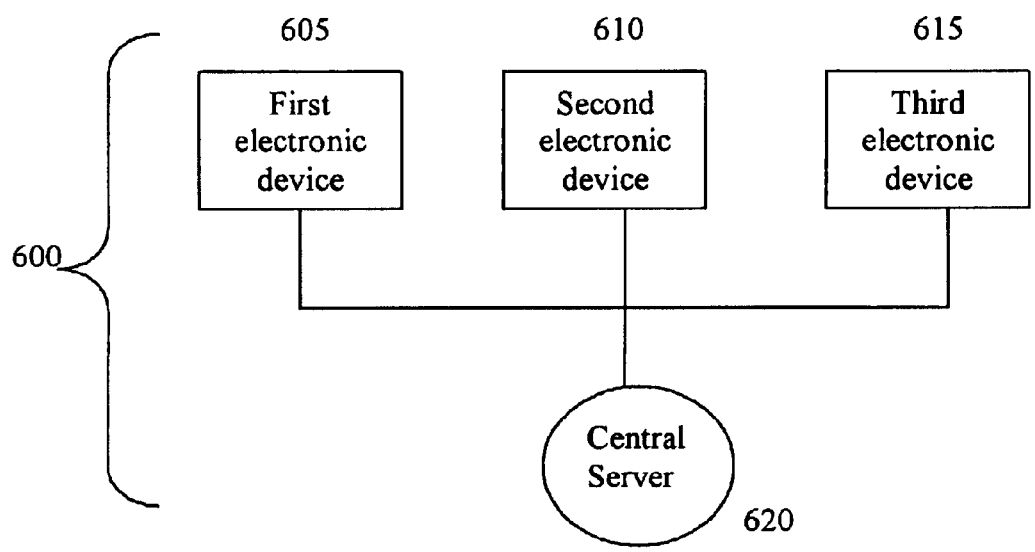
FIG. 6 illustrates several devices sharing position data via the Internet according to an embodiment of the present invention.

After the electronic device's 100 position has been ascertained, the position data may be shared with users of other devices, for example. FIG. 6 illustrates several devices, 605, 610, and 615 sharing position data via the Internet 600 according to an embodiment of the present invention. The first electronic device 605, the second electronic device 610, and the third electronic device 615 may all be connected to the Internet 600, or any other network. Any of the devices connected via the Internet may upload their position data onto a central server 620. In an embodiment, each of the devices, 605, 610, and 615 as well as the central server 620 may execute a web services application program. The web services application program allows a user to implement web services.

Web services are services that leverage the existing scalable web server infrastructure to provide a platform for offering services to applications. Applications typically load a description of the web service by making a HyperText Transport Protocol ("HTTP") request to a web server at a set Uniform Resource Locator ("URL"). An EXtensible Markup Language ("XML") page is then returned, informing the application of objects and methods available on the web server. Again, using HTTP, the application can then call methods such as SearchForBook("Title") or OrderBook ("CurtomerId"). SearchForBook is a method to find the title of a book for sale on a commercial website, such as Amazon.com, for example. OrderBook is a method of ordering the book, and keeping a record of the customer's name who ordered the book. In many ways, web services operate much like human operators would operate on a web site, but all the requests and web services responses are in machine readable format. The web services application program may serve as the interface through which the position data is shared between the electronic devices 605, 610, and 615.

In an example of a web service, a cell phone that knows its position and has wireless Internet access may access a web service method on a known web server and send its position. The cell phone may then use a web service method such as SetPosition to transmit its position and its user identification name. The web service may also provide methods for retrieving the last known position of a user or all users located near a given location.

Figure 7:
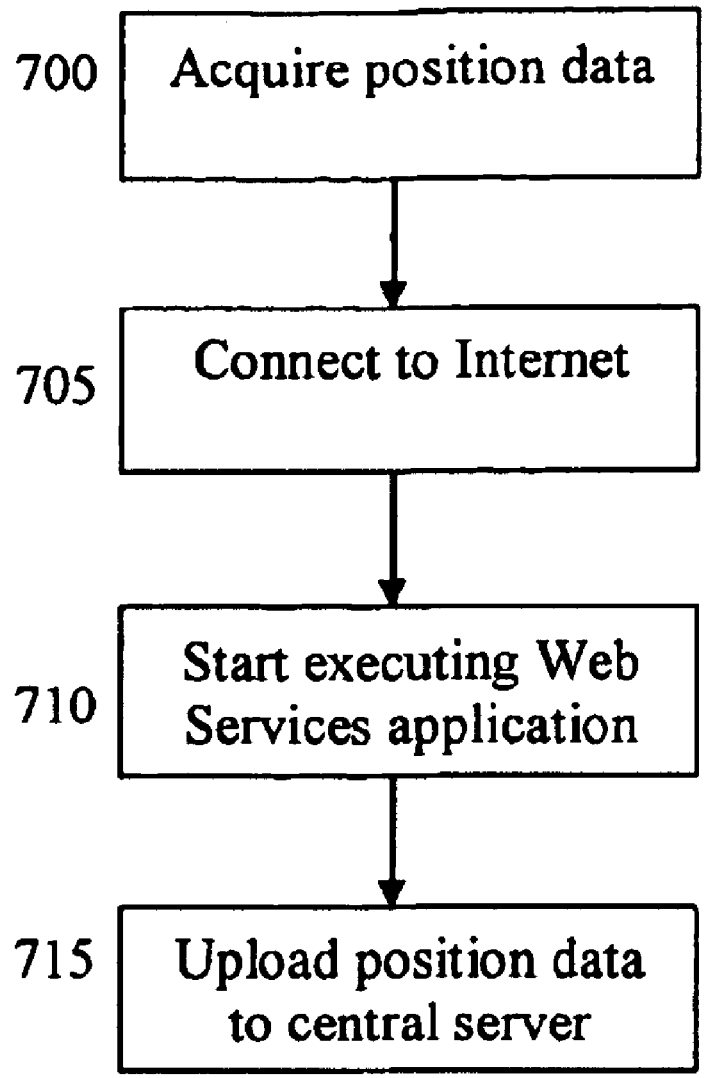
FIG. 7 illustrates a process by which an electronic device may upload its position data onto a central server according to an embodiment of the present invention.

FIG. 7 illustrates a process by which an electronic device 100 may upload its position onto the central server 620 according to an embodiment of the present invention. First, the electronic device 100 acquires 700 data concerning its position, for example by the process illustrated in FIG. 4. Next, the electronic device 100 may connect 705 to the Internet 600, or any other suitable network. The electronic device 100 may then begin executing 710 a web services application program. Finally, the electronic device 100 may upload 715 the position data to the central server 600, where it is accessible to other devices on the Internet. In an embodiment, the position data may be encrypted, so that only other users with a unique de-cryptian key may correctly view the position data.

Figure 8:
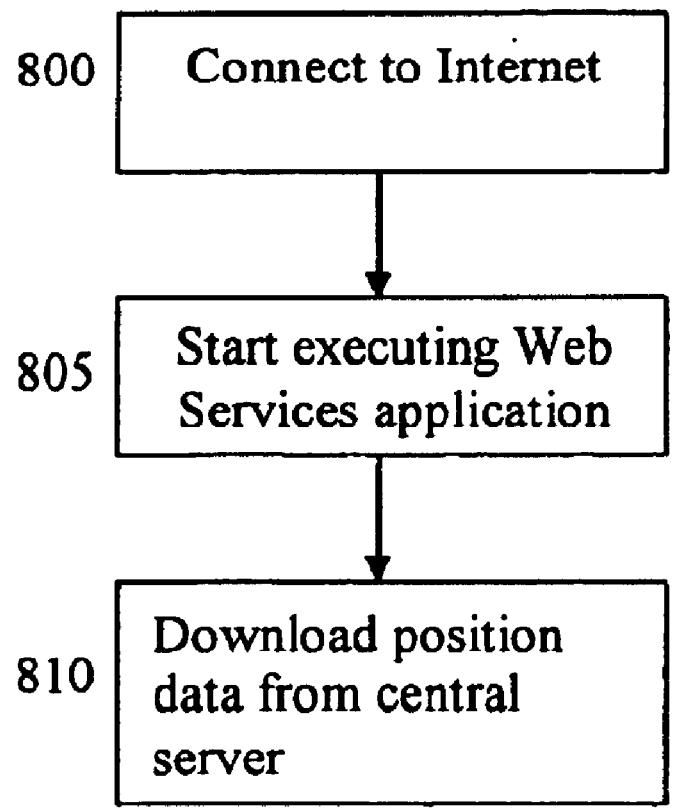
FIG. 8 illustrates a process by which an electronic device may acquire position data from the central server according to an embodiment of the present invention.

FIG. 8 illustrates a process by which an electronic device 100 may acquire position data for another predetermined device whose position data is stored in the central server 620 according to an embodiment of the present invention. First, the electronic device 100 may connect 800 to the Internet 600, or another suitable network. Next, the electronic device 100 may begin executing 805 a web services application program. Finally, the electronic device 100 may download 810 position data from the central server 600.

FIG. 9 illustrates a "buddy list" 900 of predetermined devices using the web services application according to an embodiment of the invention. The web services application program may include a "buddy list" 900, an application program that lists the position of various other pre-selected devices. The buddy list 900 may include the "user name" 905 of other devices on the buddy list, as well as the distance, or "proximity" 910, between the device on the buddy list and the user's electronic device 100.

A "reliability/time" subheading 915 may be utilized to rate how stale, or how reliable, the position data for a particular device may be. More recently obtained position data is generally more reliable than older data, and therefore receives a higher rating. The buddy list 900 may assign a triple star "***" rating to relatively reliable position data, and a single star "*" rating to relatively unreliable data. For devices that had a general trend of movement, but have not updated their position data for a certain amount of time, such as one hour, for example, the current position of the device may be estimated based upon its previously known movement trend. The application may also include a subheading "speed" 920, which corresponds to the speed of the respective device. Finally, the buddy list 900 may include a "track" 925 option to track the movement of the device. If a user clicks on the track 925 box for a particular user name 905, the web services application program may open a window with a map, and the device's movement may be tracked on the map. When the device is within 0.25 miles of the user's device 100, for example, the user's device 100 may start beeping, or indicate in another way that the selected user is nearby.

As illustrated in the buddy list 900 shown in FIG. 9, the user has three other users on his buddy list 900: Frank Rizzo, Steve Kissel, and Joe Jones. As illustrated in the "Proximity" 910 column, Frank Rizzo is 100 miles from the user, Steve Kissel is 255 miles away, and Joe Jones is 2525 miles away. Under the "Reliability/Time" column, the data for Frank Rizzo was given four stars "**", meaning that the information concerning Frank Rizzo's position is relatively very reliable. Steve Kissel was given two stars "", indicating that his position data was relatively unreliable. Joe Jones was given one star "*", indicating that his position data was relatively very unreliable. As shown in the "speed" 920 column, Frank Rizzo is travelling at 25 mph in the NW direction. In other embodiments, more precise directional coordinates may be utilized, such as 25 mph, 41.2°.

Figure 10:
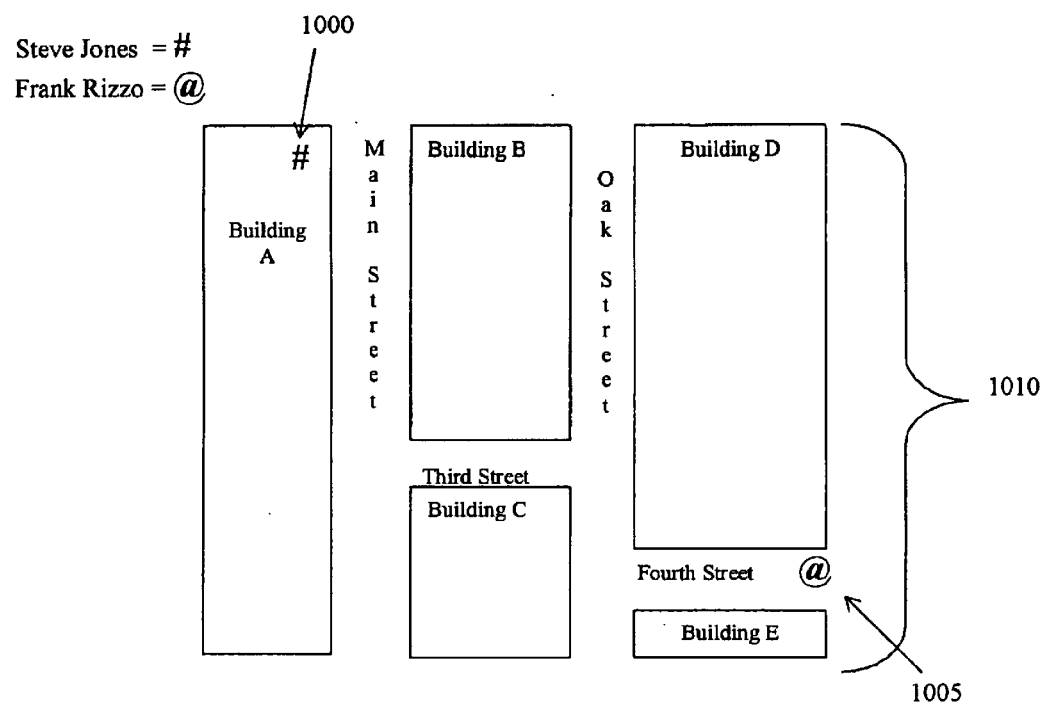
FIG. 10 illustrates a first mapping web services application program to generate a map between a first user of an electronic device and a second user of a second electronic device according to an embodiment of the present invention.

Banking, delivery, and shopping applications may also be executed by the web services application program. Such applications may be utilized to provided driving directions to a user driving to a shopping mall or a bank branch office, for example. FIG. 10 illustrates a first mapping web services application program to generate a map between a first user of an electronic device, Steve Jones 1000, and a second user, Frank Rizzo 1005, of a second electronic device according to an embodiment of the present invention. The mapping web services application program shown in FIG. 10 may be executed through the buddy list 900 (i.e., by clicking on the "track" 925 button in the "Frank Rizzo" column).

When the mapping program is executed, a map 1010 may be created, showing streets and buildings between Steve Jones 1000 and Frank Rizzo 1005. Therefore, Steve Jones 1000 may find Frank Rizzo 1005 by following a path on the illustrated map 1010. In other embodiments, direction arrows may be generated to show Steve Jones 1000 how to reach Frank Rizzo 1005 (i.e., which streets to walk down, which buildings to pass, etc.).

Figure 11:
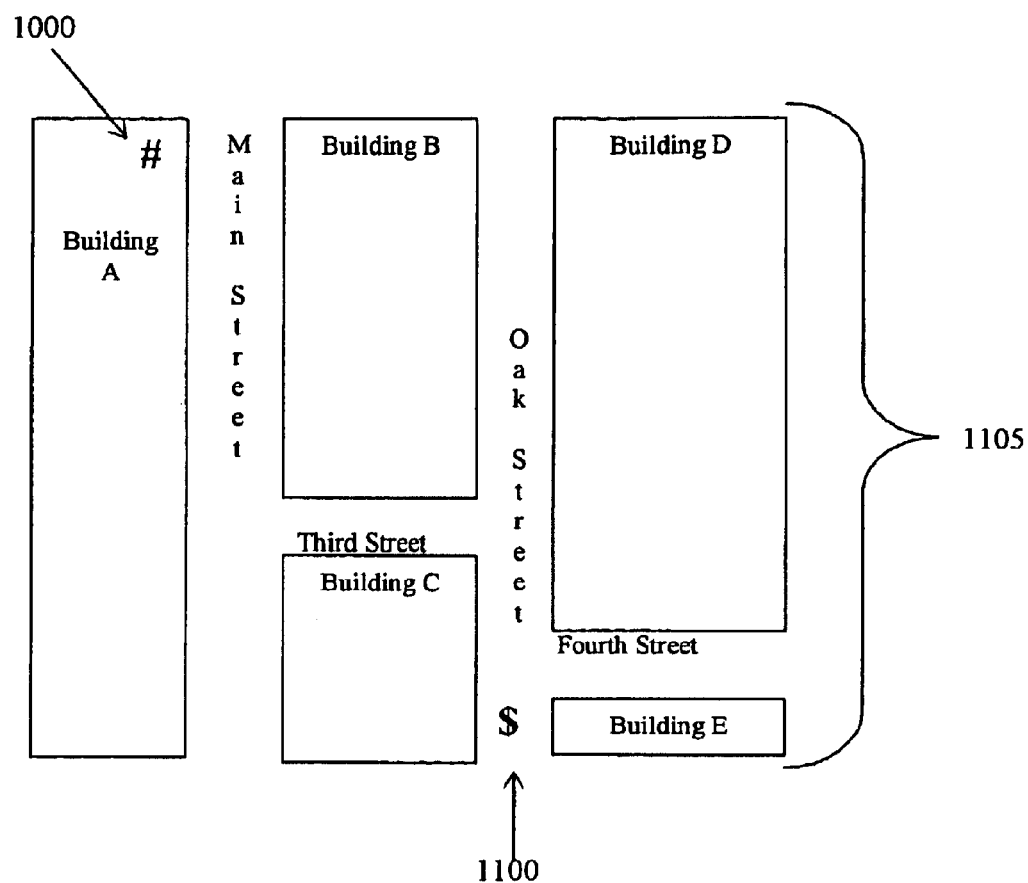
FIG. 11 illustrates a second mapping web services application program to generate a map to show the location of a bank ATM according to an embodiment of the present invention.

FIG. 11 illustrates a second mapping web services application program to generate a map to show the location of a bank ATM according to an embodiment of the present invention. To generate the map 1105 shown in FIG. 11, the user Steve Jones 1000 may execute a banking map program through the buddy list 900 or in any other suitable way. In an embodiment, the user Steve Jones 1000 may execute the second mapping program, which downloads map data from a memory accessible through the Internet, for example. The user Steve Jones 1000 may enter the name of his or banking institution, and specify whether the user wishes to use an ATM. If the user Steve Jones 1000 chooses the ATM option, the map shown in FIG. 11 may be created. The map shows Steve Jones' 1000 location (designated by "#") as well as the location of the ATM 1100 (designated by "$"). Therefore, the user Steve Jones 1000 may find the ATM 1100 by following a path on the illustrated map 1105. In other embodiments, direction arrows may be generated to show Steve Jones 1000 how to reach the ATM 1105 (i.e., which streets to walk down, which buildings to pass, etc.).

Figure 12:
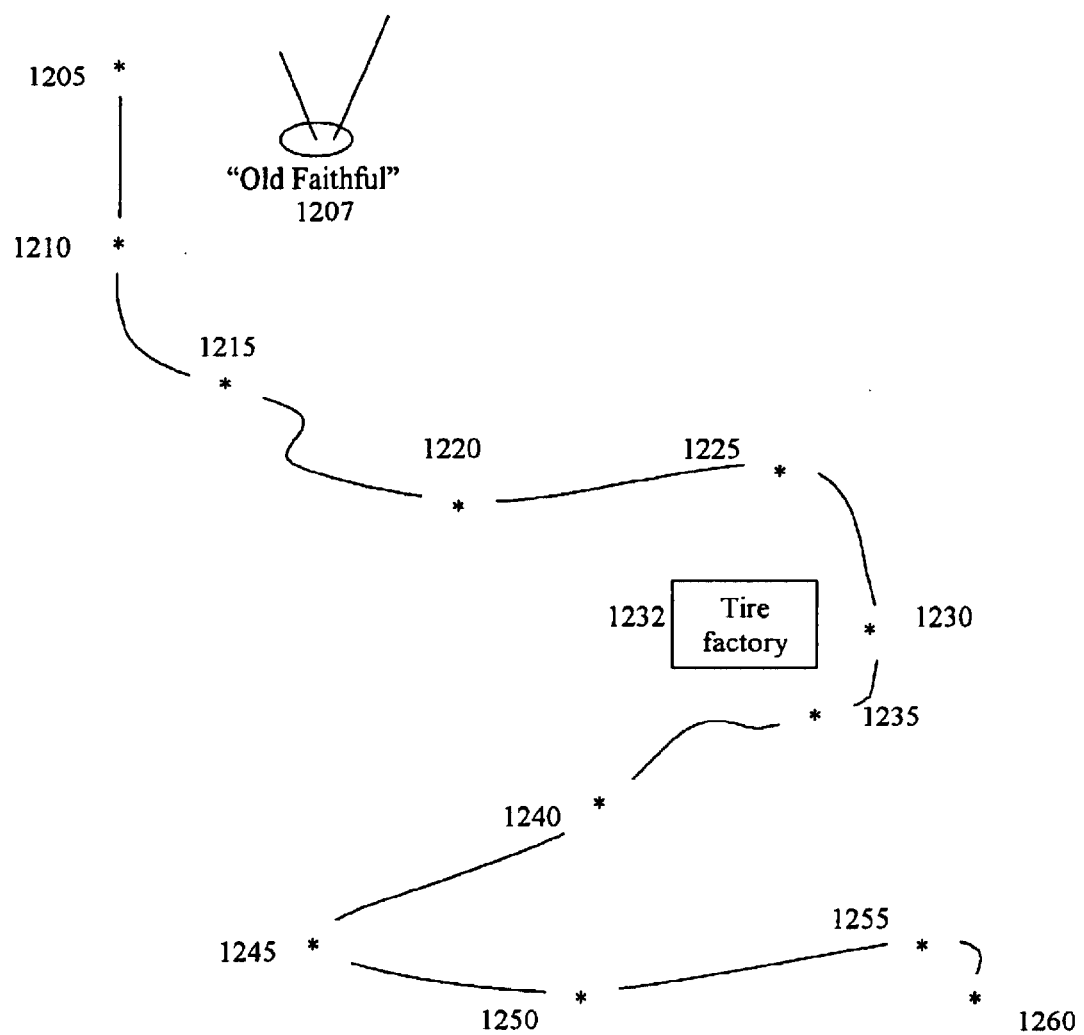
FIG. 12 illustrates a third mapping web services application program to generate a map based upon GPS meta data in digital photographs according to an embodiment of the present invention.

FIG. 12 illustrates a third mapping web services application program to generate a map 1200 based upon GPS meta data in digital photographs according to an embodiment of the present invention. When a user takes a digital photograph, the camera may append meta data to the generated digital image file. The meta data may include the time and GPS coordinates of the location where the photograph was taken. The GPS coordinates may be obtained from a GPS device or chip within the camera, or by sending out a wireless GPS coordinate request as discussed above with respect to FIGS. 1–5.

After photographs have been taken, a third mapping web services application program may be executed to generate a map 1200 to show where photographs were taken. As shown in the map 1200, the first photograph 1205 and the second photograph 1210 where taken near Old Faithful 1207. The user then took several more photographs 1215, 1220, 1225, 1230, 1235, and 1240 until reaching the Tire Factory 1232. The user then moved around and took several more photographs 1245, 1250, 1255, and 1260.

In other embodiments, the third mapping program may post the time each photograph was taken and/or list distances between the locations at which the photographs were taken.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of a local electronic device exchanging data with a central server, comprising:

transmitting position coordinates for the local electronic device to the central server; and receiving a buddy list from the central server, wherein the buddy list includes position data for a second electronic device, and the position data is stored in the central server, and at least one web services application program is executable through the buddy list, wherein the local electronic device and the second electronic device are each moveable, and the buddy list displays an approximate distance between the local electronic device and the second electronic device, and the buddy list displays a measurement of a reliability of the positional data, the measurement of the reliability being based on a time difference between a current time and a most recent previous time at which the positional data was obtained.

2. The method of claim 1, wherein the at least one web services application program includes a first mapping program to display a map illustrating a location of the local electronic device and a second location of the second electronic device.

3. The method of claim 2, wherein the first mapping program displays directions from the location of the local electronic device to the second location of the second electronic device.

4. The method of claim 1, wherein the at least one web services application program includes a second mapping program to display a map illustrating a location of the local electronic device and a second location of at least one commercial device.

5. The method of claim 4, wherein the second mapping program displays directions from the location of the local electronic device to the second location of the at least one commercial device.

6. The method of claim 1, wherein the at least one web services application program includes a third mapping program to display a map illustrating a location where at least one digital photograph was taken.

7. The method according to claim 6, wherein the location is determined from position information stored in a meta file of the at least one digital photograph.

8. The method according to claim 1, further including:

transmitting a position request signal;

receiving a position response signal;

determining the position coordinates of the electronic device, wherein if more than one position response signal is received within a predetermined length of time, a processing device determines the position coordinates based upon predetermined criteria; and storing the position coordinates in a storage device.

9. The method according to claim 1, wherein the buddy list includes a speed subheading to list a speed of a selected device.

10. The method according to claim 1, wherein buddy list includes a track subheading to track a movement of a selected device.

11. The method according to claim 1, wherein the buddy list includes a proximity subheading to list an approximate distance from a selected device to a user to whom the buddy list corresponds.

12. The method according to claim 1, wherein the buddy list displays an estimate of the positional data of the second electronic device based on a previous general trend of movement of the second electronic device when a most recent positional data of the second electronic device is older than a predetermined time threshold.

13. A position data exchanging device, comprising:

a computer-readable medium; and a computer-readable program code, stored on the computer-readable medium, having instructions to transmit position coordinates for the local electronic device to the central server; and receive a buddy list from the central server, wherein the buddy list includes position data for a second electronic device, and the position data is stored in the central server, and at least one web services application program is executable through the buddy list, wherein the local electronic device and the second electronic device are each moveable, and the buddy list displays an approximate distance between the local electronic device and the second electronic device, and the buddy list displays a measurement of a reliability of the positional data, the measurement of the reliability being based on a time difference between a current time and a most recent previous time at which the positional data was obtained.

14. The device of claim 13, wherein the at least one web services application program includes a first mapping program to display a map illustrating a location of the local electronic device and a second location of the second electronic device.

15. The device of claim 14, wherein the first mapping program displays directions from the location of the local electronic device to the second location of the second electronic device.

16. The device of claim 13, wherein the at least one web services application program includes a second mapping program to display a map illustrating a location of the local electronic device and a second location of at least one commercial device.

17. The device of claim 16, wherein the second mapping program displays directions from the location of the local electronic device to the second location of the at least one commercial device.

18. The device of claim 13, wherein the at least one web services application program includes a third mapping program to display a map illustrating a location where at least one digital photograph was taken.

19. The device according to claim 18, wherein the location is determined from position information stored in a meta file of the at least one digital photograph.

20. The device according to claim 13, wherein the computer-readable medium further includes instructions to:

transmit a position request signal;

receive a position response signal;

determine the position coordinates of the electronic device, wherein if more than one position response signal is received within a predetermined length of time, a processing device determines the position coordinates based upon predetermined criteria; and store the position coordinates in a storage device.

21. The device according to claim 13, wherein the buddy list includes a speed subheading to list a speed of a selected device.

22. The device according to claim 13, wherein the buddy list includes a track subheading to track a movement of a selected device.

23. The device according to claim 13, wherein the buddy list includes a proximity subheading to list an approximate distance from a selected device to a user to whom the buddy list corresponds.

24. The device according to claim 13, wherein the buddy list displays an estimate of the positional data of the second electronic device based on a previous general trend of movement of the second electronic device when a most recent positional data of the second electronic device is older than a predetermined time threshold.

* * * * *